United States Patent Office 2,764,517
Patented Sept. 25, 1956

2,764,517

3,4-METHYLENEDIOXYPHENYL ETHERS AS SYNERGISTS FOR PYRETHRINS

Morton Beroza, Greenbelt, Md.; dedicated to the Public

No Drawing. Application February 14, 1955,
Serial No. 488,169

15 Claims. (Cl. 167—33)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

The patent rights for the United States in any invention in the patent to be granted on this application are dedicated to the public.

This invention relates to new compounds, namely, 3,4-methylenedioxyphenyl ethers, and to the processes for their preparation. The invention relates further to insecticidal compositions containing pyrethrins or pyrethrin-type compounds and these new 3,4-methylenedioxyphenyl ethers as synergists therefor.

Pyrethrins and pyrethrin-type compounds, such as allethrin, are very useful due to their quick paralyzing or knockdown action on flies, gnats, mosquitoes, and the like. In use, they are generally mixed with inert carriers in low concentrations because of their high cost. In many cases a synergist is added. Such synergists have little or no insecticidal property in themselves but increase the action of the pyrethrins or pyrethrin-type compounds and thereby effect a saving in the use of these expensive materials.

I have found that 3,4-methylenedioxyphenyl ethers having the general formula

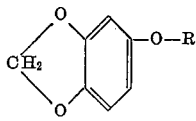

in which R is a radical selected from the group consisting of alkoxyethoxyethyl and alkoxyethyl wherein the alkoxy group contains 2 to 4 carbon atoms, such as 2(2-ethoxyethoxy)ethyl and 2(2-butoxyethoxy)ethyl, and chloroethoxyethyl such as 2(2-chloroethoxy)ethyl, act as powerful synergists for pyrethrins and pyrethrin-type compounds such as allethrin.

I have found also that compounds of the above formula in which R is alkyl such as n-amyl and isoamyl, cycloalkyl such as cyclopentyl and cyclohexyl, alkenyl such as allyl, benzyl, and such groups substituted with alkyl, cycloalkyl, halogen, and nitro groups are also somewhat synergistic although not as powerful as the alkoxyethoxyethyl, alkoxyethyl, and chloroethoxyethyl described above.

All these compounds may be prepared by Method A or Method B described hereafter (except as indicated in Table I herein).

*Method A.*—To 10 ml. of 95% ethanol was added 0.02 mole of solid potassium hydroxide in a 50-ml. round-bottomed flask fitted with a reflux condenser. The mixture was heated to dissolve the alkali and after cooling, 0.02 mole of sesamol (3,4-methylenedioxyphenol) in 10 ml. 95% ethanol was added to the alcoholic alkali. To this solution was added 0.02 mole of the appropriate halide and the resulting mixture refluxed for several hours or until no more potassium halide is formed. Water and 100 ml. ether were added to the cooled solution and the ether layer was washed several times with 10 ml. portions of 1 normal alkali (to remove unreacted sesamol) and several times with water. After drying with sodium sulfate and evaporating the ether, the product may be either distilled or crystallized from a suitable solvent depending upon whether it is liquid or crystalline. Yields were usually 65–85% of theory except for secondary or polyalkoxyalkyl ethers which were obtained in lower yields. Tertiary ethers usually did not form in appreciable yield. Method B gave much improved yields of alkoxyalkyl ethers.

*Method B.*—A mixture composed of 0.02 mole of sesamol, 0.02 mole of halide and 0.02 mole of sodium methoxide (as 10% solution in methanol) was heated at 160° C. in a sealed glass tube for several hours. After cooling the reaction mixture was taken up in ether and water and worked up as described in Method A. A 35% yield of the 2(2-butoxyethoxy)ethyl ether obtained by Method A (8-hour reflux period) was increased to 71% by employing Method B.

Table I gives chemical data on some of these sesamol ethers:

TABLE I

| Sesamol ether where "R" is— | Carbon | | Hydrogen | | Refractive index ($n^{22}$D) or M. P. (corr.) ° C. |
|---|---|---|---|---|---|
| | Calc'd | Found | Calc'd | Found | |
| n-propyl | 66.6 | 66.98 | 6.71 | 6.64 | 1.5203 |
| n-butyl | 68.0 | 67.99 | 7.26 | 7.17 | 1.5147 |
| n-amyl | 69.2 | 69.28 | 7.73 | 7.33 | 1.5112 |
| isoamyl | 69.2 | 69.12 | 7.73 | 7.36 | 47–48° |
| cyclopentyl | 69.9 | 69.99 | 6.84 | 6.79 | 1.5404 |
| cyclohexyl | 70.9 | 71.22 | 7.32 | 7.32 | 1.5374 |
| 2(2-butoxyethoxy)ethyl | 63.7 | 63.57 | 7.87 | 7.62 | 1.5019 |
| 2(2-ethoxyethoxy)ethyl | 61.4 | 60.96 | 7.12 | 7.20 | 1.5107 |
| 2-butoxyethyl | 65.5 | 65.54 | 7.61 | 7.49 | 1.5065 |
| 2(2-chloroethoxy)ethyl [a] | 54.0 | 54.65 | 5.36 | 5.52 | 1.5343 |
| 2-n-octyl | 71.95 | 71.70 | 8.86 | 8.63 | 1.4996 |
| 2-ethyl-n-hexyl | 71.95 | 71.85 | 8.86 | 8.68 | 1.4993 |
| 2-cyclohexylethyl | 72.55 | 72.64 | 8.11 | 7.85 | 56–57° |
| 2-chloroallyl | 56.5 | 56.72 | 4.28 | 4.26 | 1.5501 |
| 3-chloroallyl | 56.5 | 56.84 | 4.28 | 4.34 | 64.5–65.5° |
| allyl | 67.4 | 67.36 | 5.66 | 5.58 | 1.5400 |
| aceticacid,n-butylester [b] | 61.9 | 62.13 | 6.39 | 6.48 | 1.5106 |
| Benzyl | 73.7 | 74.08 | 5.30 | 5.19 | 1.5850 |
| o-chlorobenzyl | 64.0 | 63.96 | 4.23 | 4.14 | 63.7–64.7° |
| p-chlorobenzyl | 64.0 | 63.87 | 4.23 | 4.09 | 82–82.6° |
| 2,4-dichlorobenzyl | 56.6 | 56.61 | 3.40 | 3.35 | 101.5–103.5° |
| 3,4-dichlorobenzyl | 56.6 | 56.94 | 3.40 | 3.45 | 68.5–69.3° |
| p-bromobenzyl | 54.75 | 55.4 | 3.61 | 3.69 | 92.5–93.5° |
| p-nitrobenzyl | 61.5 | 60.75 | 4.06 | 3.88 | 119–120° |

[a] Prepared in 48% yield by using at 5:1 ratio of halide to sesamol.
[b] Prepared from 3,4-methylenedioxyphenoxyacetyl chloride and butanol.

Synergism was noted in every 3,4-methylenedioxyphenyl ether prepared, although compounds containing hydroxyl, carboxyl or strong polar groups were not tested because such compounds have not been found to exhibit marked synergistic properties. The entomological results obtained with the best syngerists are given in Table II. The turntable method was employed, 100 house flies per test being used, and refined kerosene was used as the common solvent for the synergist and the respective pyrethrins and allethrin, acetone being added when necessary to increase the solubility of the synergist. The 3,4-methylenedioxyphenyl ethers at 10 mg./ml., when used without the pyrethrins or allethrin, gave a low mortality, usually below 3% after 24 hours.

TABLE II

| 3,4-methylenedioxyphenyl ether wherein "R" is— | Synergist + pyrethrins, Mg./ml. | Percent Mortality, 24 hrs. | Synergist + allethrins, Mg./ml. | Percent Mortality, 24 hrs. | Standards | | | |
|---|---|---|---|---|---|---|---|---|
| | | | | | Pyrethrins | | Allethrins | |
| | | | | | Mg./ml. | Percent Mortality | Mg./ml. | Percent Mortality |
| n-Butyl | 10+1 | 55 | 5+0.5 | 82 | | | | |
| Cyclohexyl | 10+1 | 92 | 5+0.5 | 88 | | | | |
| Cyclopentyl | 10+1 | 82 | 5+0.5 | 84 | | | | |
| 2(2-ethoxyethoxy)ethyl | 10+1 | 99 | 5+0.5 | 98 | 2.2 | 40 | .59 | 42 |
| | | | | | 3.3 | 61 | .88 | 70 |
| 2-ethylhexyl | 10+1 | 74 | 5+0.5 | 80 | 5.0 | 79 | 1.3 | 86 |
| | | | | | 7.5 | 89 | 2.0 | 88 |
| 2(2-butoxyethoxy)ethyl | 10+1 | 99 | 5+0.5 | 99 | | | | |
| 2(2-chloroethoxy)ethyl | 10+1 | 93 | 5+0.5 | 91 | | | | |
| 2-cyclohexylethyl | 10+1 | 93 | 5+0.5 | 74 | | | | |
| p-bromobenzyl | ¹9.2+1 | 38 | ¹4.6+0.5 | 82 | 1.5 | 20 | 0.5 | 25 |
| | | | | | 3.38 | 48 | 1.33 | 78 |

¹ Acetone added to increase solubility of synergist.

The proportions of 3,4-methylenedioxyphenyl ethers and the pyrethrins and the pyrethrin-type compounds may be varied over a wide range. The preferred ranges, however, are from 0.15–2.0 mg./ml. pyrethrins or pyrethrin-type compound with from 1.0 to 20 mg./ml. of the 3,4-methylenedioxyphenyl ether.

The compositions may be formulated with other conventional materials commonly used in the insecticide art, such as carriers, toxic materials and other additives.

What is claimed is:

1. A 3,4-methylenedioxyphenyl ether of the formula

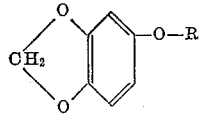

in which R is a radical selected from the group consisting of alkoxyethoxyethyl and alkoxyethyl wherein the alkoxy group contains 2 to 4 carbon atoms, and chloroethoxyethyl.

2. The ether of claim 1 in which R is alkoxyethoxyethyl.

3. The ether of claim 2 in which the alkoxyethoxyethyl is 2(2-ethoxyethoxy)ethyl.

4. The ether of claim 2 in which the alkoxyethoxyethyl is 2(2-butoxyethoxy)ethyl.

5. The ether of claim 1 in which R is alkoxyethyl.

6. The ether of claim 1 in which R is chloroethoxyethyl.

7. The ether of claim 6 in which the chloroethoxyethyl is 2(2-chloroethoxy)ethyl.

8. A process of preparing a 3,4-methylenedioxyphenyl ether having the formula

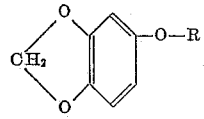

in which R is a radical selected from the group consisting of alkoxyethoxyethyl and alkoxyethyl wherein the alkoxy group contains 2 to 4 carbon atoms, and chloroethoxyethyl, comprising reacting an alcoholic solution of the sodium salt of sesamol with the corresponding halide at a temperature of 160° C.

9. An insecticide comprising a member selected from the group consisting of pyrethrins and allethrin and, as a synergist therefor, a 3,4-methylenedioxyphenyl ether of the formula in which R is a radical selected from the group consisting of alkoxyethoxyethyl and alkoxyethyl wherein the alkoxy group contains 2 to 4 carbon atoms, and chloroethoxyethyl.

10. The insecticide of claim 9 in which R is alkoxyethoxyethyl.

11. The insecticide of claim 10 in which the alkoxyethoxyethyl is 2(2-ethoxyethoxy)ethyl.

12. The insecticide of claim 10 in which the alkoxyethoxyethyl is 2(2-butoxyethoxy)ethyl.

13. The insecticide of claim 9 in which R is alkoxyethyl.

14. The insecticide of claim 9 in which R is chloroethoxyethyl.

15. The insecticide of claim 14 in which the chloroethoxyethyl is 2(2-chloroethoxy)ethyl.

References Cited in the file of this patent

UNITED STATES PATENTS 2,485,680   Wachs   Oct. 25, 1949

OTHER REFERENCES

Hughest et al.: Chem. Abst., vol. 47, p. 2176 (1953), citing Australian J. Sci. Research A5, pp. 206–15 (1952).
Baker et al.: J. Chem. Soc. 1932, pp. 1281–83.
Baker et al.: J. Chem. Soc. 1938, pp. 1603, 1606.
Kerr et al.: Chem. Abst., vol. 46, p. 2227 (1952).
Bick et al.: J. Chem. Soc. 1953, p. 695.
Wacek et al.: Chem. Abst., vol. 34, p. 1636 (1940).